April 16, 1929.  F. J. WEMETT  1,709,509

HORSESHOE

Filed May 25, 1927

Inventor
Frank J. Wemett
By Lyon & Lyon
Attorneys

Patented Apr. 16, 1929.

1,709,509

UNITED STATES PATENT OFFICE.

FRANK J. WEMETT, OF LOS ANGELES, CALIFORNIA.

HORSESHOE.

Application filed May 25, 1927. Serial No. 194,068.

This invention relates to a horseshoe and particularly to the type of horseshoe which involves the use of a soft tread for the shoe. Heretofore horseshoes have been provided with a soft tread, but such horseshoes have usually employed some kind of a rigid frame, bar, or other rigid means for securing the same to the horse's hoof. This rigid part of the shoe increases the cost of the shoe and increases its weight. It also necessitates careful fitting of the rigid part to the hoof.

The general object of this invention is to produce a horseshoe of this type which is devoid of a rigid frame for securing the same to the horse's hoof and which is, therefore, relatively inexpensive to manufacture and easy to apply to the hoof.

Further objects of the invention will appear hereinafter.

The invention consists in the novel parts and combination of parts to be described hereinafter, all of which contribute to produce an efficient horseshoe.

A preferred embodiment of the invention is described in the following specification, while the broad scope of the invention is pointed out in the appended claims.

In practicing the invention, I provide a pad 1 of a relatively soft material. This pad 1 is preferably constructed of a plurality of layers 2 of relatively non-elastic fabric, such as course duck or canvas. In constructing this pad the layers of fabric are preferably impregnated with rubber, that is to say, they are rubberized and pressed into a pad. The pad covers substantially the entire area of the under face of the horse's hoof, and has the outline of the horse's hoof 3, to which the shoe is to be applied. The shoe also includes a lower pad or block 4 of soft rubber which also conforms to the shape of the shoe and the upper side of this block is vulcanized to the lower side of the pad. This pad of rubber extends down and its under side forms the ground face of the shoe. This ground face is unobstructed by any projections.

Figure 1:
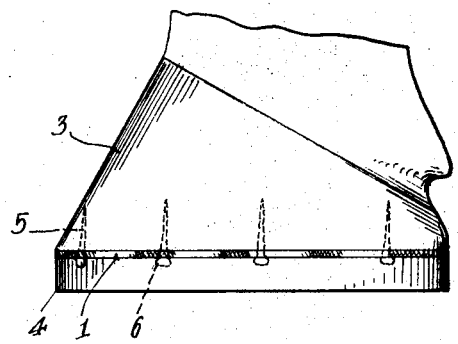
Fig. 1 is a side elevation showing the horse's hoof with the leg of the horse broken away and illustrating one of my horseshoes applied to the hoof.
Figure 2:
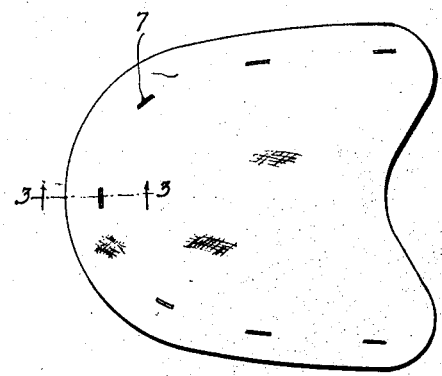
Fig. 2 is a bottom plan of the horseshoe.
Figure 3:
Fig. 3 is a section taken about on the line 3—3 of Fig. 2 on an enlarged scale.

In shoeing a horse with this shoe it is simply necessary to apply it to the under side of the hoof and then drive regular horseshoe nails through the shoe and up into the hoof, as indicated in Fig. 1. These nails should be driven completely through the rubber pad 4, so that their heads 6 seat against the fabric pad 1. In doing this a driving punch may be applied in the opening 7 which is formed by the head of the nail as it passes up through the lower pad 4.

A shoe embodying the features of this invention is devoid of any rigid part except the nails which attach it to the hoof. Evidently the shoe can be manufactured in quantities at a very low cost.

The pad 1 is preferably constructed like the fabric of an ordinary automobile casing and is very tough and durable. It is sufficiently strong to prevent the pad 1 from working off of the nails. On account of the fact that there are no rigid parts in the shoe all of the forces acting on the fabric are in an upper direction. On account of the soft and elastic material of the pad 4 it gives good footing for the animal in walking and it is also substantially noiseless on payments. The pad 4 preferably has its lower face disposed in a single plane, that is to say, the pad is not depressed or relieved under the middle portion of the hoof. This gives a larger bearing surface and reduces the wear on the shoe.

What I claim is:

1. A horseshoe consisting of an upper pad of relatively non-elastic fabric adapted to cover substantially the entire area of the under face of the horse's hoof, and a lower pad covering the under side of the upper pad consisting of elastic material extending continuously down from the upper pad to the lower face of the shoe, and comprising the ground-face of the shoe, said lower face being a continuous unobstructed face coming in direct contact with the ground, said upper pad being devoid of metal eyelets and adapted to have nails passed therethrough in direct contact with the material thereof.

2. A horseshoe consisting of an upper pad conforming to the outline of a horse's hoof, covering the entire lower face of the hoof and composed of layers of fabric, a lower pad of elastic material vulcanized to the under side of the upper pad and extending continuously from the upper pad down to the lower face of the shoe and comprising the ground face of the shoe, said upper pad being devoid of metallic eyelets for nails, and adapted to have the nails passed directly through the upper pad and in direct contact with the material of the pad to secure the same to the horse's hoof, said ground face being a continuous unobstructed face engaging the ground throughout its entire area.

3. A horseshoe devoid of metallic parts, consisting of a pad, said pad consisting of layers of fabric constructed to cover the entire area of the under face of a horse's hoof, and a block of rubber covering the entire area of the under side of the pad and vulcanized thereto, said block extending continuously from the said fabric down to the lower face of the shoe, and comprising the ground face of the shoe.

4. A horseshoe devoid of metallic parts, consisting of a pad composed of a plurality of layers of fabric covering substantially the entire area of the under face of a horse's hoof, said layers of fabric being impregnated with rubber, and a block of rubber covering the under face of the fabric, vulcanized thereto and extending continuously from the fabric down to the lower face of the shoe and comprising the ground face of the shoe, said block having a continuous unobstructed ground face operating to engage the ground throughout its entire area.

Signed at Los Angeles, California, this 19 day of May, 1927.

FRANK J. WEMETT.